United States Patent
Okanaka et al.

(10) Patent No.: US 7,677,537 B2
(45) Date of Patent: Mar. 16, 2010

(54) STOPPER STRUCTURE FOR ENGINE MOUNT

(75) Inventors: Takehiro Okanaka, Kasugai (JP); Tetsuji Andou, Inuyama (JP)

(73) Assignee: Tokai Rubber Industries, Ltd., Komaki-shi (JP)

( * ) Notice: Subject to any disclaimer, the term of this patent is extended or adjusted under 35 U.S.C. 154(b) by 892 days.

(21) Appl. No.: 11/361,813

(22) Filed: Feb. 23, 2006

(65) Prior Publication Data

US 2007/0262502 A1 Nov. 15, 2007

Related U.S. Application Data

(63) Continuation-in-part of application No. 10/789,689, filed on Feb. 27, 2004, now abandoned.

(30) Foreign Application Priority Data

Feb. 28, 2003 (JP) .............................. 2003-055017

(51) Int. Cl.
*F16M 1/00* (2006.01)
(52) U.S. Cl. .................. 267/140.3; 267/141.7; 267/152
(58) Field of Classification Search .................. 267/219, 267/220, 257, 35, 292, 293, 294, 140–140.4, 267/141, 141.7, 147, 152, 153
See application file for complete search history.

(56) References Cited

U.S. PATENT DOCUMENTS

| 4,530,491 A | 7/1985 | Bucksbee et al. |
|---|---|---|
| 5,232,061 A | 8/1993 | Neeleman |
| 5,431,260 A | 7/1995 | Gross et al. |
| 5,532,061 A | 7/1996 | Menovcik et al. |
| 5,580,028 A | 12/1996 | Tomczak et al. |
| 6,250,615 B1 | 6/2001 | Leibach |
| 6,302,385 B1 | 10/2001 | Summers, III et al. |
| 7,159,856 B2 | 1/2007 | Satori et al. |
| 2002/0158391 A1 | 10/2002 | Kodama et al. |

FOREIGN PATENT DOCUMENTS

| EP | 0780592 A2 | 6/1997 |
|---|---|---|
| JP | 9-166175 | 6/1997 |
| JP | 2001-349368 | 12/2001 |
| JP | 2002-340079 | 11/2002 |
| JP | 2003-004086 | 1/2003 |

*Primary Examiner*—Xuan Lan Nguyen
(74) *Attorney, Agent, or Firm*—Beyer Law Group LLP

(57) ABSTRACT

A stopper structure including: a rigid abutting member extending in its longitudinal direction with a rectangular cross sectional shape; and a rubber stopper having a base portion of tubular cross sectional shape and secured press-fit onto the rigid abutting member without being adhesive thereto, two peripheral projections formed on laterally opposite sides of a first abutting plane of the base portion and extending in the longitudinal direction, and a central projection formed on an intermediate area interposed between the peripheral projections of the first abutting plane of the base portion. The peripheral projections are situated above laterally opposite edges of a first abutting plane of the rigid abutting member, and have a width dimension extending inside and outside the laterally opposite edges. The central projection projects outward from the first abutting plane of the base portion with the same height as the peripheral projections.

6 Claims, 13 Drawing Sheets

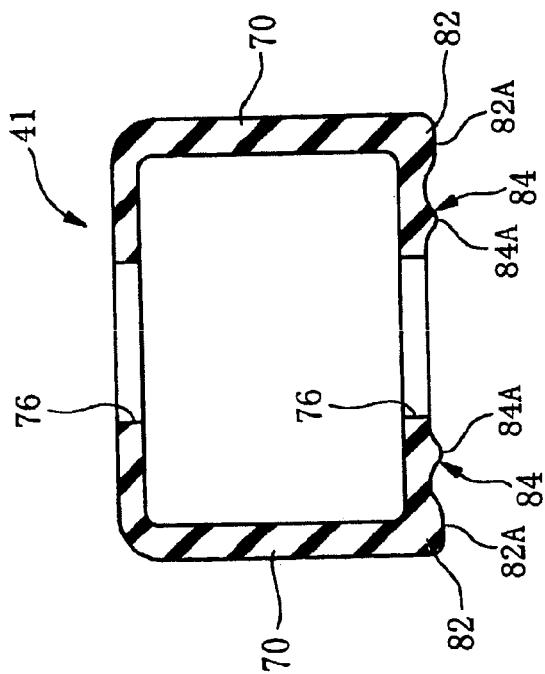
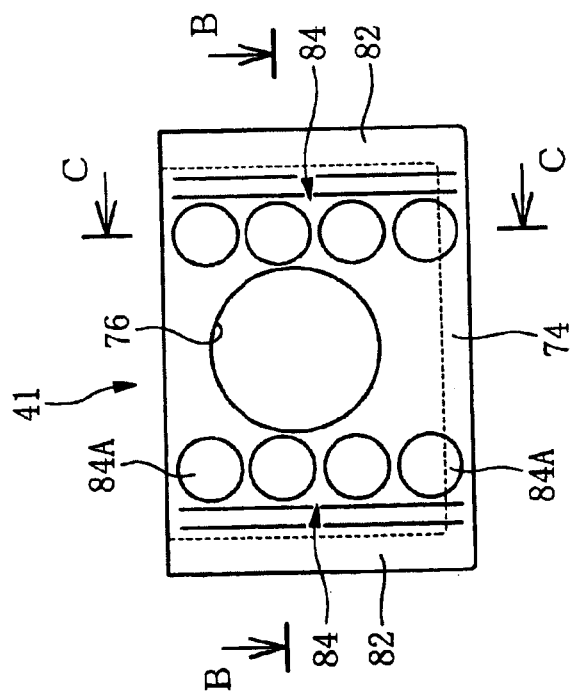

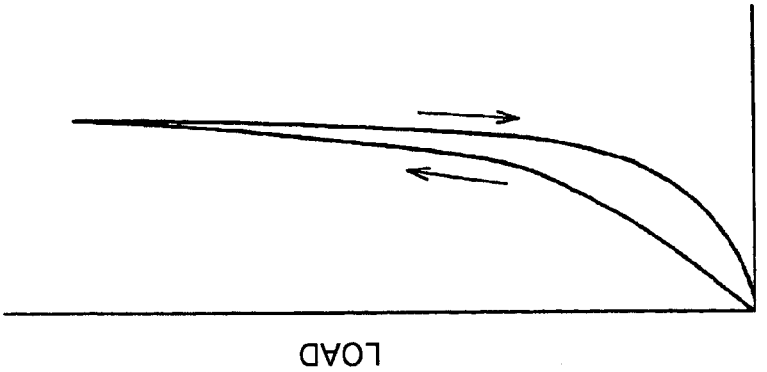
FIG. 9A (PRIOR ART) COMPARATIVE EXAMPLE 1
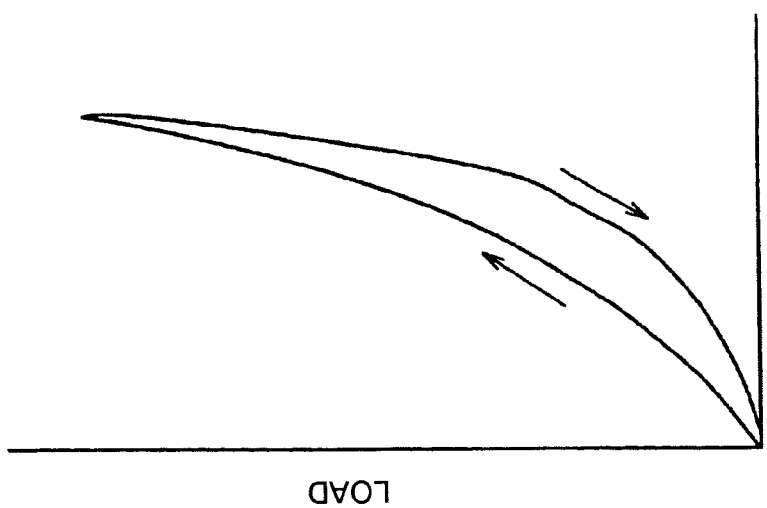
FIG. 9B (PRIOR ART) COMPARATIVE EXAMPLE 2
FIG. 9C (PRIOR ART) COMPARATIVE EXAMPLE 3
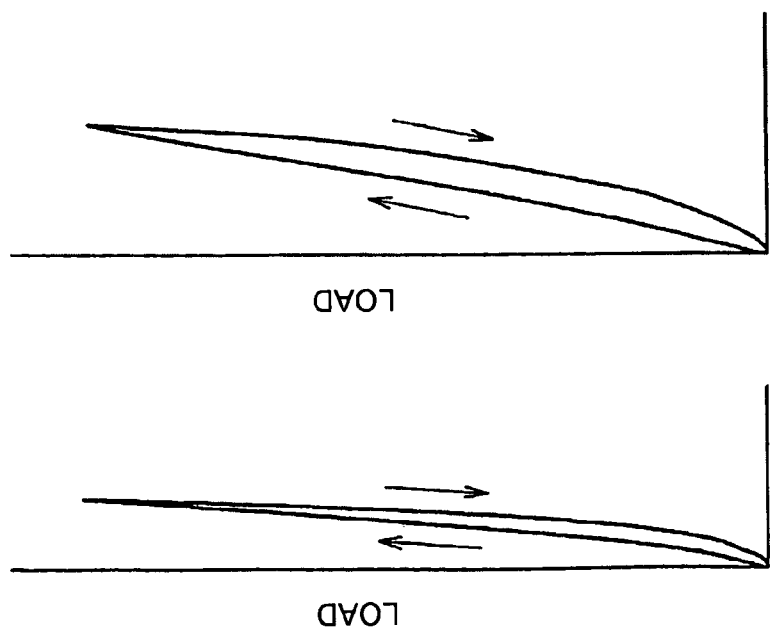
FIG. 9D PRESENT INVENTION

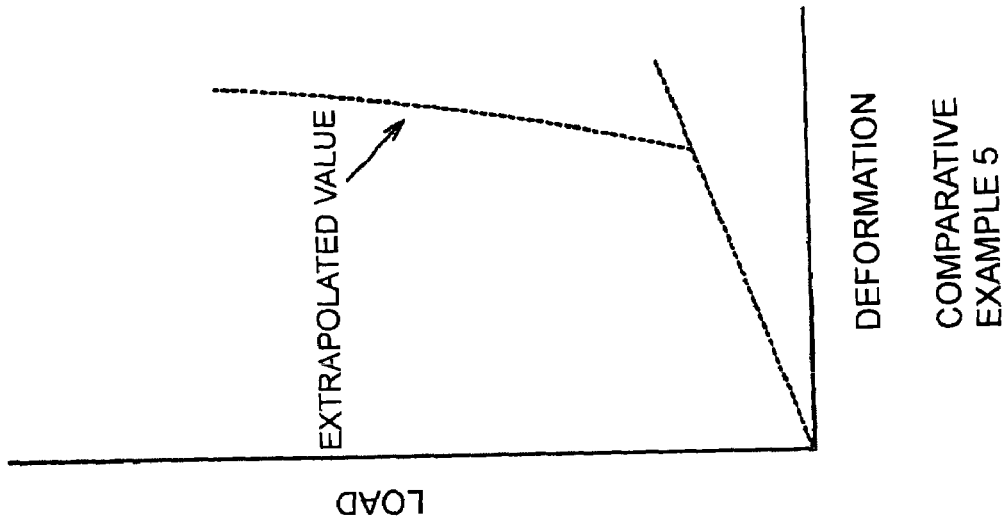
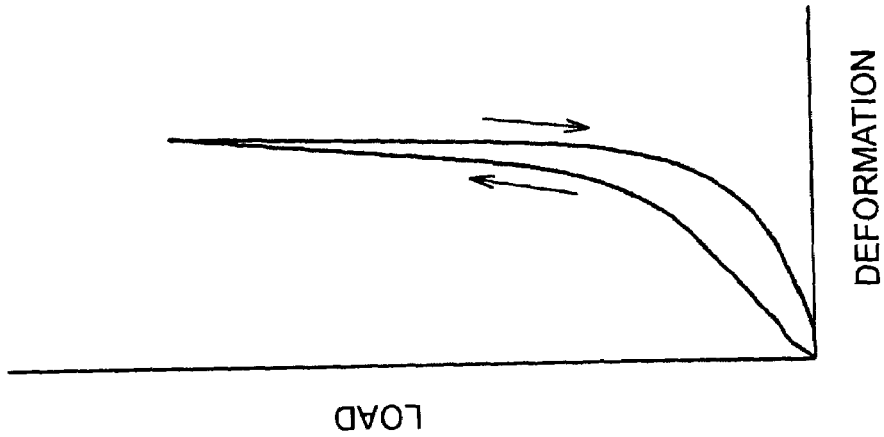

COMPARATIVE EXAMPLE 1

COMPARATIVE EXAMPLE 2

COMPARATIVE EXAMPLE 3

COMPARATIVE EXAMPLE 3

PRESENT INVENTION

COMPARATIVE EXAMPLE 4

COMPARATIVE EXAMPLE 5

PRIOR ART

STOPPER STRUCTURE FOR ENGINE MOUNT

This application is a Continuation-in-Part of application Ser. No. 10/789,689 filed Feb. 27, 2004 now abandoned.

INCORPORATED BY REFERENCE

The disclosure of Japanese Patent Application No. 2003-055017 filed on Feb. 28, 2003 including the specification, drawings and abstract is incorporated herein by reference in its entirety.

BACKGROUND OF THE INVENTION

1. Field of the Invention

The present invention relates generally to stopper structures for engine mounts, more particularly to such a stopper structure in which a rubber stopper formed independently and secured press-fit onto an abutting member connected to one of two mounting members of an engine mount, without being adhesive to a superficial surface of the abutting member.

2. Description of the Related Art

An engine mount has been widely used for elastically mounting or hanging a power unit of an automotive vehicle on or from a body of the vehicle in a vibration damping fashion. Generally, such an engine mount includes a rubber elastic body elastically connecting a first mounting member fixable to the power unit, a second mounting member fixable to the body of the vehicle, and an elastic body elastically connecting the first and second mounting members. In the engine mount, a stopper structure is incorporated to limit excess displacement between the first and second mounting members in a direction of vibration input, by bringing an abutting portion connected to the first mounting member into abutting contact with the other abutting portion connected to the second mounting member, or vice versa. The stopper structure includes a rubber stopper for cushioning an impact and/or noise upon abutment of the abutting portions against each other.

FIG. 13 shows an example of conventional engine mount 200 of fluid-filled type. The engine mount 200 includes a mount body 201 that is mounted to a vehicle body (not shown) via a mounting bracket 203.

The mounting bracket 203 includes a holding portion 209 of cup shape having a bottom 205, and a fixing portion 215 having a pair of legs 211, 211 and a sheet 213 by which the legs 211, 211 are connected together, and on which the bottom 205 of the holding portion 209 is received. The holding portion 209 holds the mount body 201 in a press-fit manner, and the fixing portion 215 is fastened at distal ends of the legs 211, 211 to the body of the vehicle, by means of suitable fastening members.

As shown in FIG. 13, a connector arm 217, which is disposed on the side of the power unit, is inserted into a space 219 defined between the pair of legs 211, 211 and situated below the holding portion 209, and is connected to a mounting shaft 216 of a first mounting member 208 of the mount body 201.

A rubber stopper 221 has an overall rectangular tubular shape corresponding to a transverse cross sectional view of the connector arm 217, and is secured press fit onto an outer surface of the connector arm 217 in a non-adhesion manner, such that the connector arm 217 is elastically inserted into the rubber stopper 221.

An upper portion 221A of the rubber stopper 221 is brought into abutting contact with an abutting portion 223 of the mounting bracket 203, and an lower portion 221B of the rubber stopper 221 is brought into abutting contact with an abutting portion 227 of a sub-frame 229 of the body. With this arrangement, a relative displacement between the first and second mounting members 208 and 209 in the vertical direction is suitably limited. In the rubber stopper 221, the upper portion 221A as well as the lower portion 221B are formed with a flat plate configuration having a substantially constant wall thickness over an entire widthwise direction.

Keeping pace with a recent tendency of upgrading quietness in vehicles, there is an increasing demand for rubber stoppers of stopper structures, like the rubber stopper 221, to enhance its shock absorbing performance while maintaining its durability.

The desired durability of the rubber stopper 221 may be obtained by forming it with the flat-plate shape having a thin and substantially constant wall thickness as shown in FIG. 13. Namely, this arrangement permits that a surface pressure acting on the rubber stopper 221 during its abutting contact against the abutting portions 213, 227, evenly distributes over a wide area of the rubber stopper 221. Therefore, the rubber stopper 221 is free from a local considerable deformation or a local stress concentration, leading to an enhanced durability of the rubber stopper 221.

However, this arrangement gives the rubber stopper 221 undesirable load-deformation characteristics (i.e. spring characteristics recognized in a two dimensional graph) which is skyrocketed at the initial stage of the abutting contact of the rubber stopper 221 against the abutting portions 213, 227.

Alternatively, it may be proposed for ensuring the desired durability of the rubber stopper 221 to provide local abutting portions on the abutting surface of the rubber stopper 221. This makes a feeling of touch of the rubber stopper 221 against each of the abutting portions 213, 227 soft, permitting the rubber stopper 221 to provide a soft stopper performance. However, the local abutting portions are likely to suffer from a relatively large deformation and stress, leading to earlier damages and deteriorations of the local abutting portions, resulting in a low durability and a short lifetime of the rubber stopper 221. JP-A-9-166175 and JP-A-2001-349368 disclose examples of conventional rubber stoppers used in stopper structures in engine mounts of hanging type.

The conventional stopper structure as disclosed in the aforesaid documents may suffer from stress concentration at laterally opposite edge portions of upper and lower portions 221A and 221B, which portions are pressed onto corresponding corners of the connector arm 217. Namely, when the upper and lower portions 221A and 221B of the rubber stopper 221 are brought into abutting contact with the abutting portions 213, 227, respectively, the laterally opposite edge portions of the upper and lower portions 221A and 221B is very likely to undergo outward elastic deformation along the superficial profile of the connector arm 217. With this state, the corners provide resistance to the outward elastic deformation of the laterally opposite edge portions, thus generating stress concentration at the laterally opposite edge portions. This results in cracks or other damages of the rubber stopper 221 at the edge portions, thus deteriorating durability of the rubber stopper 221 and the stopper structure.

As is understood from the foregoing description, the durability and the soft stopper performance of the rubber stopper 221 are contradictory to each other, and it has not yet developed a rubber stopper capable of exhibiting both of a desired durability and soft stopper performance.

SUMMARY OF THE INVENTION

It is therefore one object of this invention to provide a stopper structure for an engine mount for automotive vehicles, which is capable of exhibiting a sufficient durability, and a soft stopper performance, as well.

The above and/or other objects of this invention may be attained according to at least one of the following modes of the invention. Each of these modes of the invention is numbered like the appended claims and depending from the other mode or modes, where appropriate, to indicate possible combinations of elements or technical features of the invention. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

A first mode of the invention is a stopper structure for an engine mount including an elastic body elastically connecting two mounting members, and stopper structure comprising: (a) a rigid abutting member connected to one of the two mounting members, and extending in a longitudinal direction with a substantially rectangular shape in cross section; and (b) a rubber stopper including: a base portion of tubular shape in cross section, and being secured press-fit onto the rigid abutting member without being adhesive to a superficial surface of the rigid abutting member; a pair of peripheral projections formed on laterally opposite sides of a first abutting plane of the base portion and extending in the longitudinal direction of the rigid abutting member; and at least one central projection formed on an intermediate area interposed between the pair of peripheral projections of the first abutting plane of the base portion, wherein the pair of peripheral projections are respectively situated above laterally opposite edges of a corresponding first abutting plane of the rigid abutting member, respectively, and have a width dimension extending inside and outside the laterally opposite edges of the rigid abutting member, and wherein the at least one central projection projects and the pair of peripheral projections project outward from the first abutting plane of the base portion with a substantially same height dimension.

According to this mode of the invention, the rubber stopper includes the pair of peripheral projections and the at least one central projection, which are formed on respective portions of the base portion separately from each other, and project outwardly from the base portion with different height dimensions, respectively. This arrangement permits the two kinds of projections to share functions required for rubber stoppers for engine mounts, i.e., durability and soft stopper performance, in an efficient manner. Described in detail, the pair of peripheral projections are situated above the laterally opposite edges of the corresponding first abutting plane of the rigid abutting member, and have a sufficient width extending inside and outside the respective laterally opposite edges, as well as a sufficient height or thickness. With the help of the peripheral projections superimposing the laterally opposite edges of the first abutting plane of the rigid abutting member, is prevented a conventionally experienced excess outward displacement or elastic deformation of the peripheral portion of the first abutting plane of the base portion of the rubber stopper along an superficial profile of the rigid abutting member, when the first abutting plane of the rubber stopper is brought into abutting contact with an abutting surface provided on a member connected to the other one of the two mounting member. Accordingly, the rubber stopper is less likely to suffer from or free from a stress-concentration at a local area pressed onto the laterally opposite edges of the first abutting plane of the rigid member, and a resultant cracking or other defects due to the stress concentration. Therefore, the rubber stopper having the pair of peripheral projections of aforesaid unique structure can enhance durability thereof, and resultant durability of the stopper structure.

Namely, when employing only the pair of peripheral projections, the rubber stopper is not able to sufficiently absorb a shock during operation of the stopper structure, and when employing only the central projections, the rubber stopper is not able to ensure a sufficient durability due to inevitable excess elastic deformation of the central projections. In addition, the latter rubber stopper can exhibit soft stopper performance at an initial stage in the course of abutting contact of the central projection against the abutting portion, but may still suffer from an abrupt increase in resistance to deformation thereof, once an amount of elastic deformation of the central projection reaches a predetermined threshold level.

According to the present invention, the use of the central projection together with the pair of peripheral projections can eliminates a shock during operation of the stopper structure, which may be generated in the rubber stopper having only the pair of peripheral projections. Also, the use of the peripheral projection together with the central projection can eliminate a conventional problem of low durability due to damage of the central peripheral projection, which may be generated in the rubber stopper having only the central projections. Thus, the stopper structure constructed according to the present invention can exhibit both of an excellent stopper characteristics and sufficient durability, concurrently.

It should be noted that, the number of central projections is not particularly limited, and may be desirably changed depending upon required spring and/or stopper characteristics of the rubber stopper. Likewise, each of the peripheral projection may have a desirable form, provided the peripheral projection situated above and has a width extending inside and outside the corresponding corner of the rigid abutting member, while extending longitudinally. It should also be noted that the rigid abutting member includes a member formed independently of the one mounting member and then connected to the mounting member, and a member integrally formed with the one mounting member.

A second mode of the invention is a stopper structure according to the first or second mode, wherein the first abutting plane of the rubber stopper is brought into abutting contact with an abutting portion provided by a member connected to an other one of the two mounting member, upon application of an excess load to the engine mount in a bound direction. With this arrangement, the stopper structure can provide a bound stopper, and exhibits excellent stopper performance with respect to the excess input load in the bound direction. It should be appreciated that the member providing the abutting portion includes a member formed independently of the other mounting member, and a member integrally formed with the other mounting member.

A third mode of the invention is a stopper structure according to any one of the first through third modes, wherein a direction in which the rubber stopper is inserted onto the rigid abutting member to be secured press fit thereon is conform to the longitudinal direction in which the pair of peripheral projections extend. This arrangement makes it easy to insert the rubber stopper onto the rigid abutting member.

A fourth mode of the invention is a stopper structure according to any one of the first through fourth modes, wherein the at least one central projections comprises a plurality of central projections, and the plurality of central projections arranged in at least one straight line extending parallel to the pair of peripheral projections.

A fifth mode of the invention is a stopper structure according to any one of the first to fifth modes, wherein the central projection is situated inside the laterally opposite edges of the first abutting plane of the base portion of the rigid abutting member in the lateral direction. With this arrangement, the central projection is free from damages due to stress concentration caused by the laterally opposite edges of the rigid abutting member.

A sixth mode of the invention is a stopper structure according to any one of the first through sixth modes, wherein each of the pair of peripheral projections provides substantially flat abutting surfaces on a top thereof, and the at least one central projection has a cone-like shape. According to this arrangement, the peripheral projections can receive a load applied to thereto with a relatively wide area, thereby further ensuring durability of the rubber stopper as well as the stopper structure. On the other hand, the central portion is suitably configured to exhibit a desired non-linear spring characteristics or a soft stopper performance, thus further absorbing a shock during operation of the stopper structure.

A seventh mode of the invention is a stopper structure according to any one of the first through sixth modes, wherein the stopper structure is arranged for a hanging type engine mount for automotive vehicles, the other one of the mounting members is connected to a body of the vehicle, and the rigid abutting member comprises a connector arm disposed below the engine mount and connected to the one of the two mounting members in order to hang a power unit from the one of the two mounting members, and wherein the first abutting plane of the base portion of the rubber stopper is brought into abutting contact with an abutting portion provided on the body of the vehicle upon application of an excess load to the engine mount in a bound direction. According to this mode, the present stopper structure can be installed in the hanging type fluid-filled engine mount with high space utilization. It should be appreciated that the stopper structure can provide a rebound stopper on the opposite side from the first abutting plane in a bound/rebound load input direction.

BRIEF DESCRIPTION OF THE DRAWINGS

The foregoing and/or other objects features and advantages of the invention will become more apparent from the following description of a preferred embodiment with reference to the accompanying drawings in which like reference numerals designate like elements and herein:

FIG. 8A is a bottom elevational view of a rubber stopper, FIG. 8B is a cross sectional view taken along line B-B of FIG. 8A, and FIG. 8C is a cross sectional view taken along line C-C of FIG. 8A;

FIG. 9D is a graph demonstrating spring characteristics of rubber stopper constructed according to the present invention, and FIGS. 9A-9C are graphs demonstrating spring characteristics of comparative examples of rubber stoppers;

FIGS. 10A and 10B are graphs demonstrating spring characteristics of other comparative examples of rubber stoppers;

DETAILED DESCRIPTION OF PREFERRED EMBODIMENTS

Figure 1:
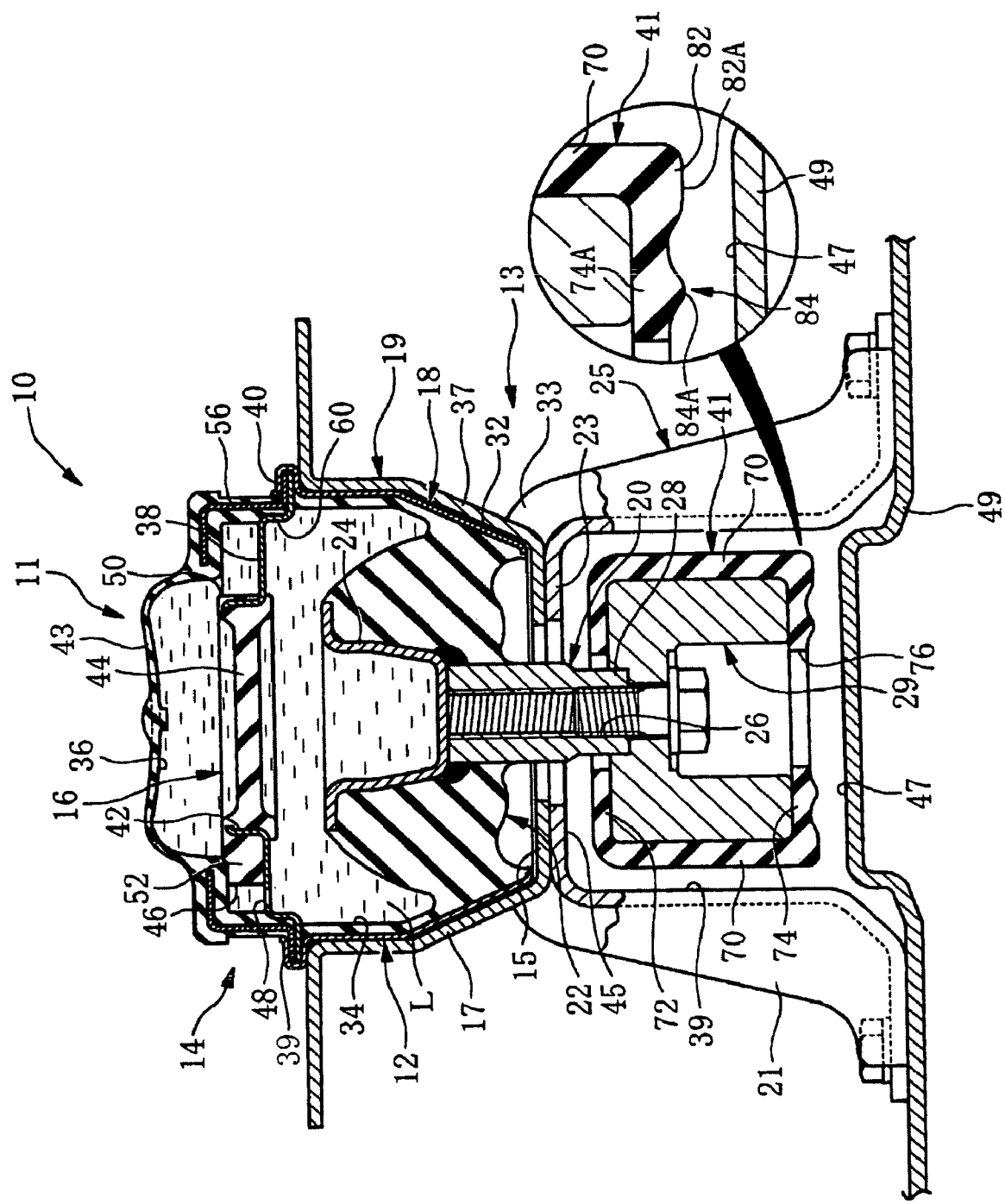
FIG. 1 is a vertical cross sectional view of a stopper structure constructed according to the present invention, which is installed in a fluid-filled engine mount of hanging type.
Figure 2:
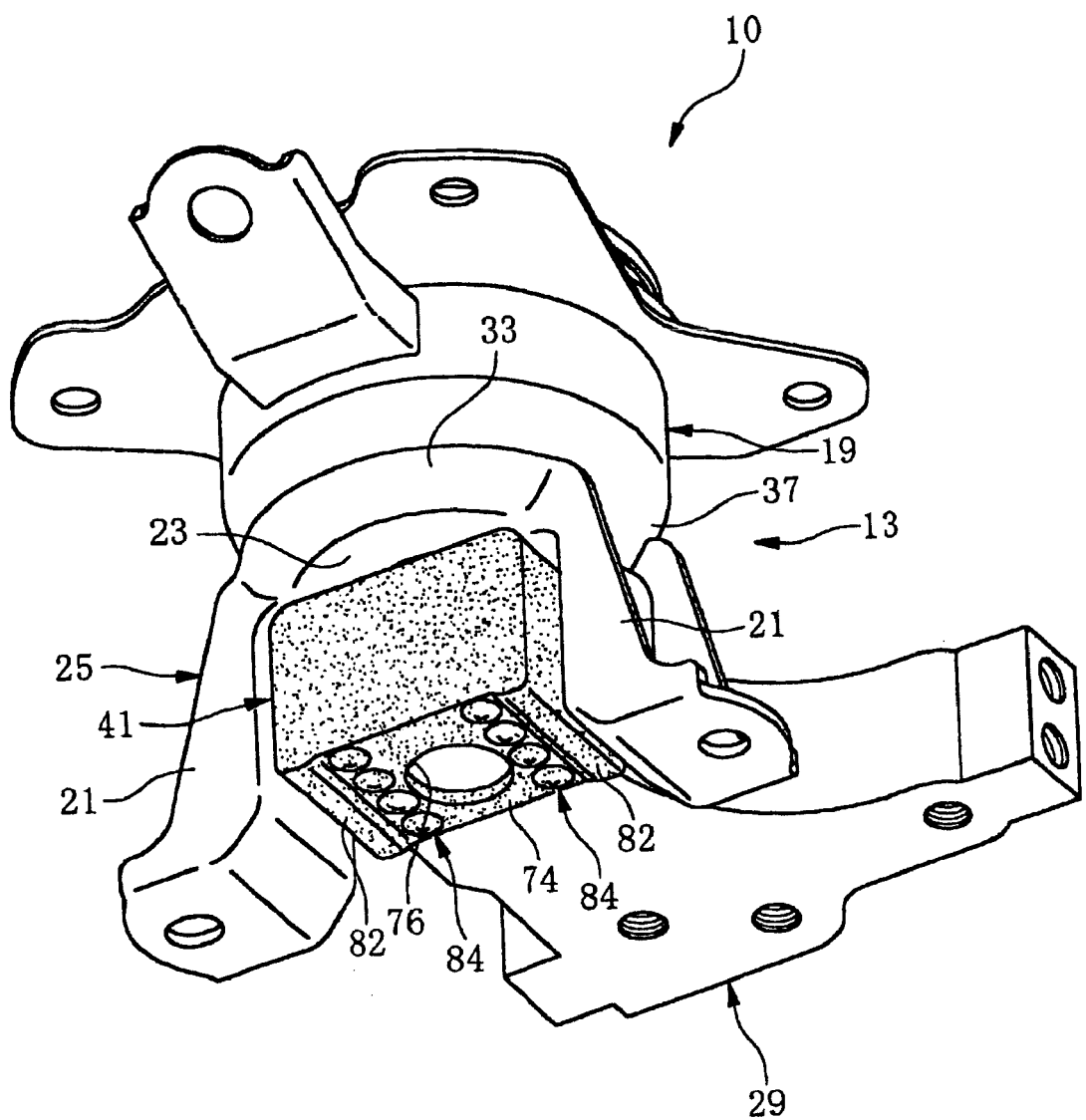
FIG. 2 is a perspective view showing a state where a rubber stopper of FIG. 1 is installed in the engine mount of FIG. 1.
Figure 3:
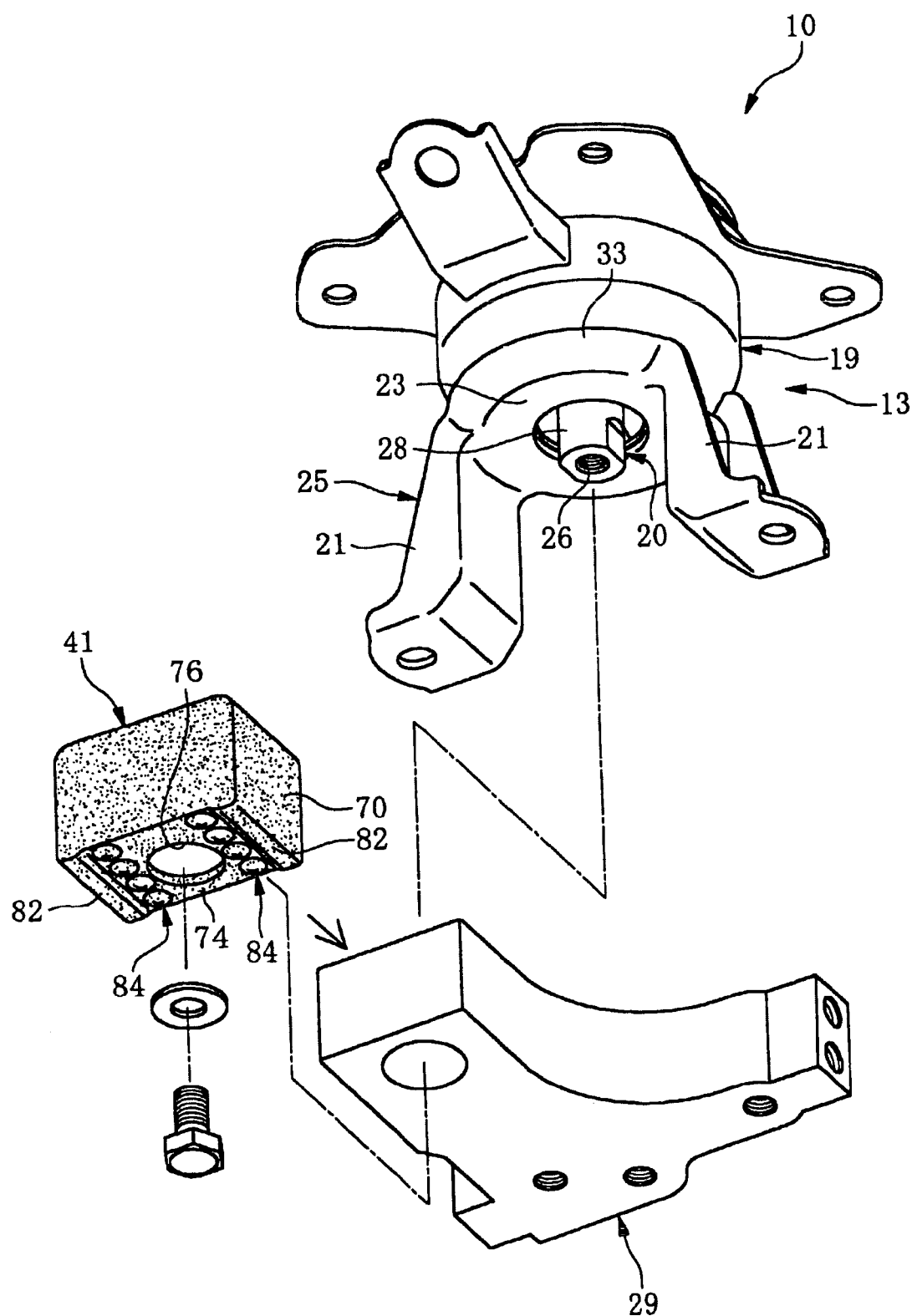
FIG. 3 is an exploded perspective view suitable for explaining an installation of the rubber stopper into the engine mount of FIG. 1.

Referring first to FIGS. 1-3, there is shown a fluid-filled engine mount 10 of hanging type including a mount body 11, a mounting bracket 13 for mounting the mount body 11 on a body of the vehicle (not shown).

The mounting bracket 13 includes a holding portion 19 having a cup shaped part 17 and a bottom 15, and a fixing portion 25 having a pair of legs 21, 21 and a sheet 23 by which the legs 21, 21 are connected together, and on which the bottom 15 of the holding portion 19 is received. The holding portion 19 holds the mount body 11 in a press-fit manner, and the fixing portion 25 is fastened at distal ends of the legs 21, 21 to a member on the body side, e.g., a sub frame 49 of the vehicle.

An abutting member in the form of a connector arm 29 is a member disposed on a side of a power unit, and is inserted into a space 39 defined between the pair of legs 21, 21 and situated below the holding portion in an axis direction thereof. The connector arm 29 is connected to a mounting shaft 28 of the mount body 11 by means of a bolt or other fastening members.

A rubber stopper 41 has an overall rectangular tubular shape corresponding to a transverse cross sectional view of the connector arm 29, and is press-fit onto a superficial surface of the connector arm 29 in a non-adhesive manner. The rubber stopper 41 is brought into abutting contact against an abutting surface 45 of the mounting bracket 13, and an abutting surface 47 of the sub frame 49, so as to limit an amount of relative displacement between a first mounting member in the form of an inner shaft member 20 and a second mounting member in the form of an outer sleeve member 18 of the mount body 11, in the vertical direction as seen in FIG. 1.

Figure 4:
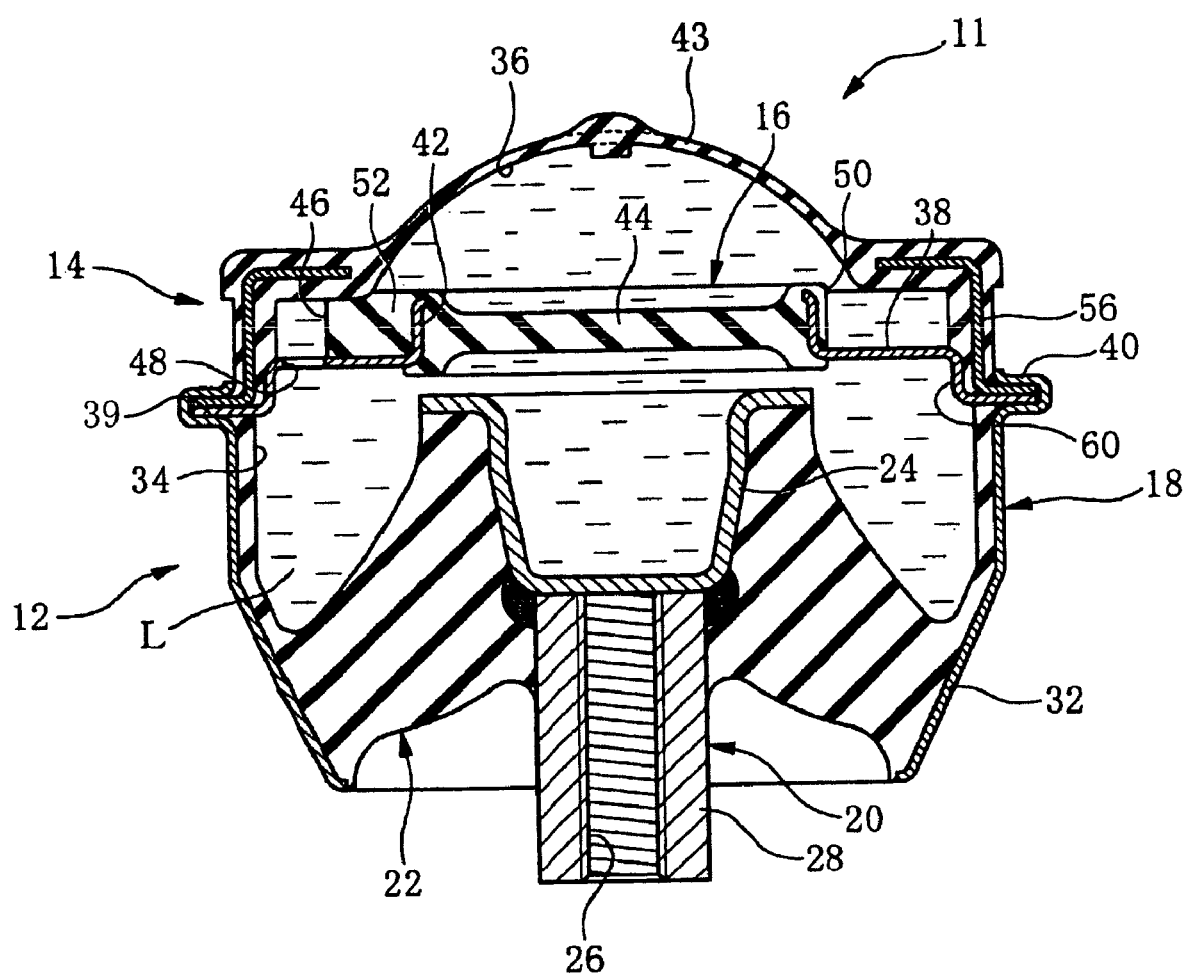
FIG. 4 is a vertical cross sectional view of a mount body of the engine mount of FIG. 1.
Figure 5:
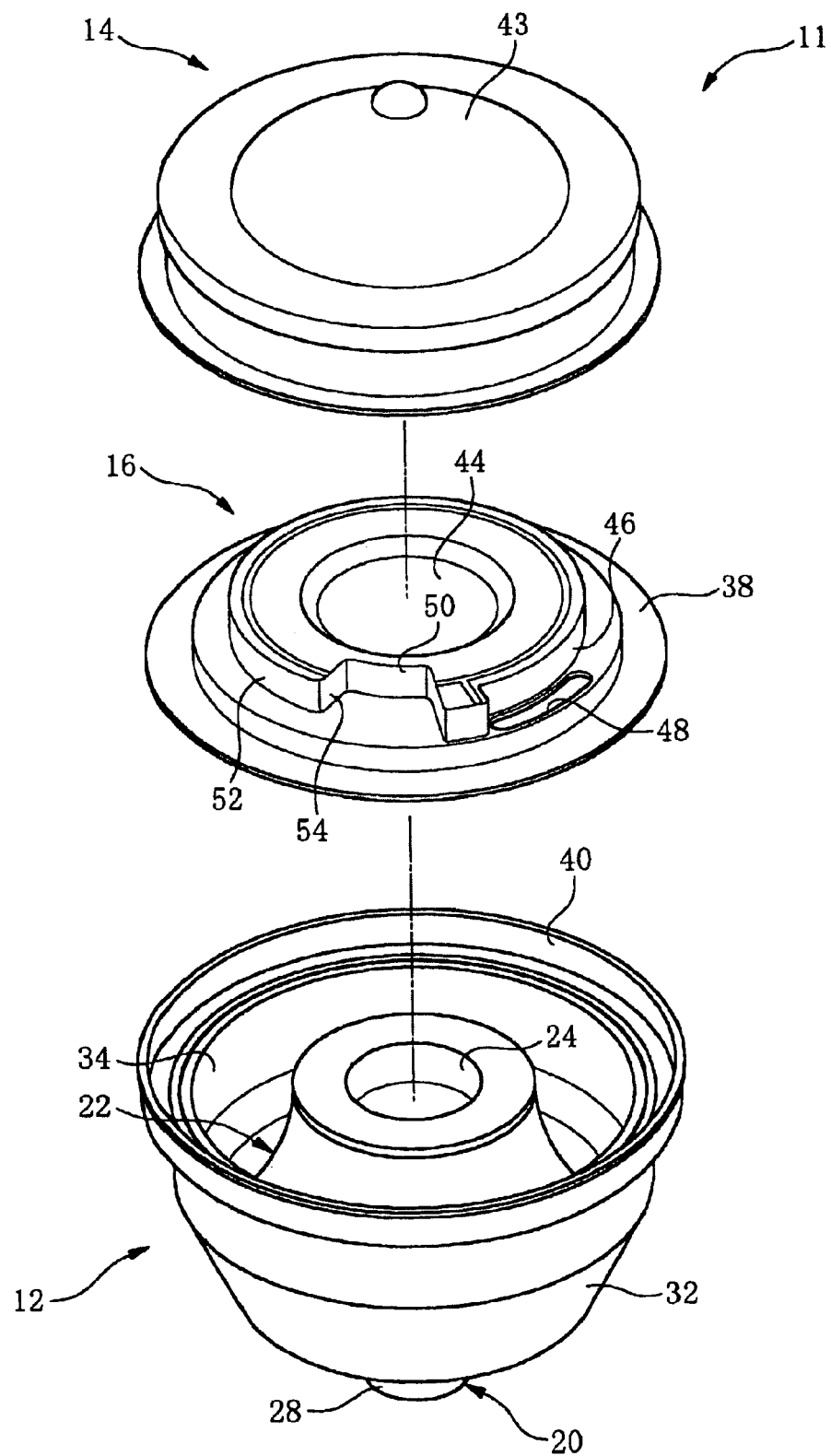
FIG. 5 is an exploded perspective view of the mount body of FIG. 4.
Figure 6:
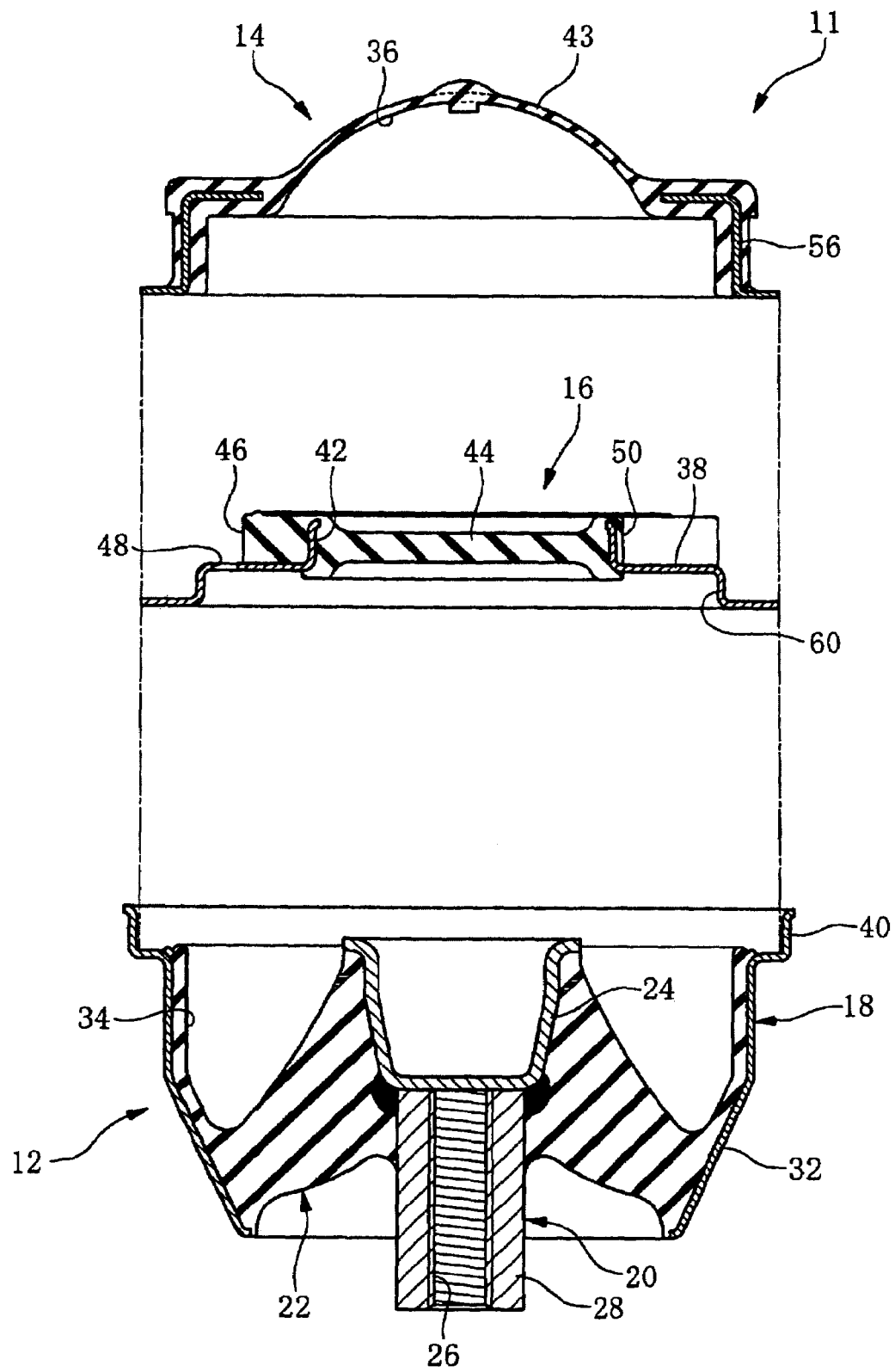
FIG. 6 is an exploded vertical cross sectional view of the mount body of FIG. 4.

FIGS. 4-6 show the mount body 11 more detail. The mount body 11 includes the inner shaft member 20 made of rigid metal, the outer sleeve member 18 formed of a tubular rigid metal, and a rubber elastic body 22 elastically connecting the inner shaft member 20 and the outer sleeve member 18. A lid member 14, and an intermediate partition member 16 are superposed on and fixed to an upper open end of the mount body 11, in order to close the opening of the mount body 11.

The inner shaft member 20 includes an upper cup-shaped portion 24 having a flange portion extending diametrically outwardly, and a lower shaft portion 28 having a tapped bore 26. As shown in FIG. 1, the mount body 11 is fixable at the inner shaft member 20 to a power unit of the vehicle via the connector arm 29. Also, the mount body 11 is fixable at the outer sleeve member 18 to the body of the vehicle via the mounting bracket 13. With this arrangement, the power unit is supported by the body of the vehicle in a hanging state.

FIG. 4 shows a state where no power unit is hanged from the mount body 11, and FIG. 1 shows an engine hanging state where the power unit is hanged from the mount body 11 that is fixed to the body of the vehicle 49.

The rubber elastic body 22 is a member of substantially truncated conical configuration, and is disposed about the inner shaft member 20 with a substantially annular configuration. More specifically, the rubber elastic body 22 extends diametrically diagonally between an tapered portion 34 of the outer sleeve member 18 and an upper portion of the inner shaft member 20, which extends from an upper end portion of the mounting shaft 28 to a rim of the flange portion, thereby elastically connecting the inner shaft member and the outer sleeve member 18, respectively.

The upper open end of the mount body 11 is closed by the lid member 14 with a fluid-tight sealing, thereby forming a fluid tight area defined within the mount body 11. This fluid-tight area is filled with a non-compressible fluid L, such as water, alkylene glycol, polyalkylene glycol, silicone oil and others, thereby providing a fluid chamber. A low viscosity fluid having a viscosity of 0.1 Pa·s. or lower is preferably selected.

This fluid chamber is divided into two parts by means of the partition member 16, namely, a pressure receiving chamber 34 on the lower side of the partition member 16, and an auxiliary fluid chamber 36 on the upper side of the partition member 16. The partition member 16 includes an annular rigid partition plate 38 made of metal. The partition plate 38 is laminated at its outer rim portion on a shoulder portion 39 of the outer sleeve member 18, and is firmly fixed to the outer sleeve member 18 by pressingly bending a caulking portion 40 of the outer sleeve member 18 against the outer rim portion in the process of caulking fixation. Thus, the partition plate 38 is integrally bonded to the outer sleeve member 18.

In the present embodiment, the partition plate 38 is a metallic plate formed by press-bending, having a wall thickness of 1 mm.

The partition plate 38 has a large-diameter opening 42 that is fluid-tightly closed by a movable layer 44. The movable layer 44 is formed of a rubber elastic body and integrally bonded to the partition plate 38 in the process of vulcanization of a rubber material for forming the movable layer 44. The movable layer 44 undergoes elastic deformation in the vertical direction as seen in FIG. 1, thereby absorbing a fluid pressure variation induced in the pressure receiving chamber 34. The lid member 14 includes flexible diaphragm 43 and cooperate with the partition member 16 to define therebetween the auxiliary fluid chamber 36.

The partition plate 38 and the lid member 14 cooperate to each other to define therebetween an orifice passage 46 extending circumferentially at their outer peripheral portions. One of opposite ends of the orifice passage 46 is held in communication with the pressure receiving chamber 34 through a first communication hole 48, and the other one of opposite ends of the orifice passage 46 is held in fluid communication with the auxiliary fluid chamber 36, whereby the fluid L can flow through the orifice passage 46 between the pressure receiving chamber and the auxiliary fluid chamber 36.

As is apparent from FIGS. 4 and 5, the first and second communication holes are situated adjacent to each other so that the orifice passage 46 can extend circumferentially with a circumferential length slightly smaller than a circumference of the partition member 16. In the present embodiment, a rubber block 52 is integrally bonded on the partition plate 38 together with the movable plate 44 in the process of vulcanization of a rubber material for forming the rubber block 52. As shown in FIGS. 4 and 5, this rubber block 52 includes a cutout portion 54 at one circumferential position, whereby the second communication hole 50 is formed by utilizing this cutout portion 54 of the rubber block 52.

While the orifice passage 46 is defined between the outer peripheral portions of the lid member 14 and the partition member 16 as discussed above, a metallic core member 56 of plate shape is embedded within the outer peripheral portion of the lid member 14, as shown in FIG. 4. The core member 56 is firmly fixed to the outer sleeve member 18 together with the partition plate 38 by bending the caulking portion 40 against thereto, in the process of aforementioned caulking fixation (see FIG. 4).

The fluid-filled engine mount 10 constructed as described above, is capable of effectively damping input vibrations, through an energy absorption on the basis of viscous flow of the fluid L through the orifice passage 46 between the pressure receiving chamber 34 and the auxiliary fluid chamber 36, when subjected to low frequency vibrations applied thereto in the vertical direction. This damping performance is most excited at a frequency band in which resonance effect of the fluid L through the orifice passage 46 is exhibited. In the present embodiment, the orifice passage 46 is tuned so that resonance of the fluid flowing through the orifice passage 46 is generated at a frequency band of engine shake vibrations, i.e., within a range of 10-20 Hz.

When the frequency of the input vibration higher than the frequency band to which the orifice passage 46 is tuned, a resistance to flow of the fluid through the orifice passage 46 tends to be increased, resulting in a substantially closed state of the orifice passage 46. In this state, the movable layer 44 is forced to elastically displaced or deformed back and force in the vertical direction in accordance with fluid pressure variation induced in the pressure-receiving chamber 34, whereby the fluid pressure variation induced in the pressure-receiving chamber 34 can be absorbed by the elastic displacement of the movable layer 34.

Figure 7A:
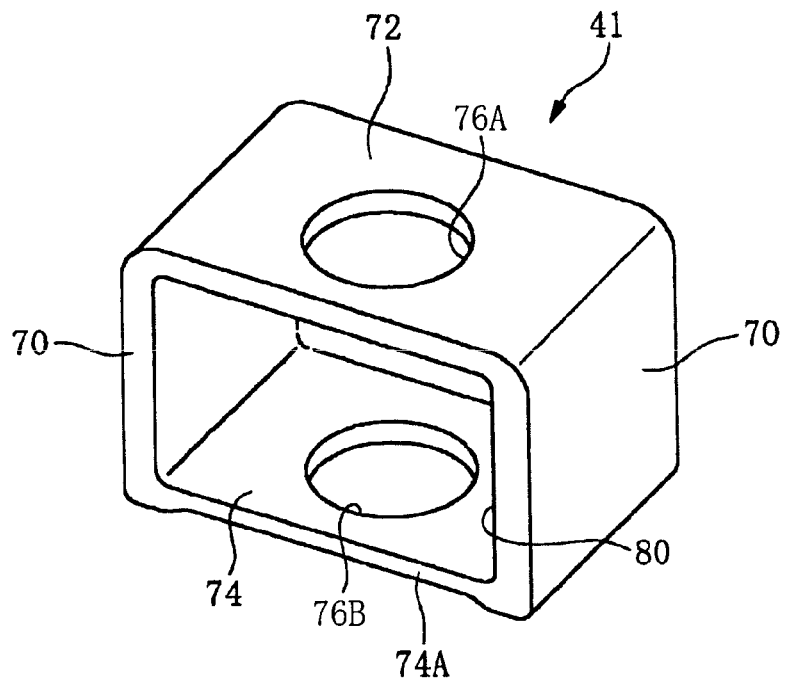
FIGS. 7A and 7B are perspective views solely show a rubber stopper of the invention.
Figure 7B:
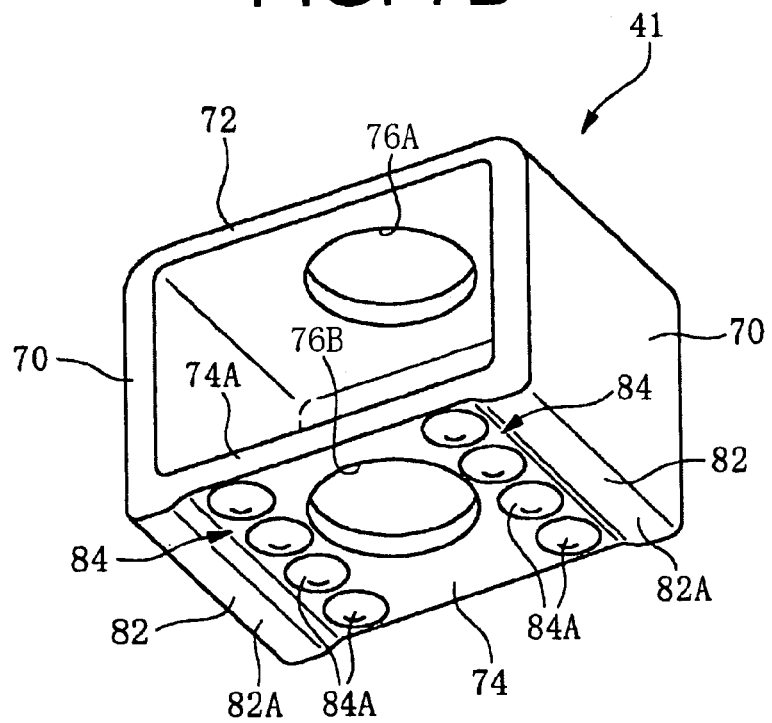

Referring back to FIG. 1, the tubular rubber stopper 41 has a base portion of tubular or rectangular shape in cross section. The rubber stopper 41 is illustrated in detail in FIGS. 7 and 8. The base portion of the rubber stopper 41 includes a pair of sidewall portions 70, 70, a top wall portion 72, and a bottom wall portion 74 functioning as a first abutting plane of the base portion of the rubber stopper 41. The top and bottom wall portions 72, 74 have circular through holes 76A, 76B, respectively. The through hole 76A in the top wall portion 72 is formed for permitting insertion of the shaft member 28 extending therethrough, as shown in FIG. 1. On the other hand, the through hole 76B in the bottom wall portion 74 is formed for permitting an insertion of a mounting bolt and for providing a working space for fastening the mounting bolt into the mounting shaft 28.

The pair of sidewall portions 70, 70 and the top wall portions 72 are flat plate members with a substantially constant wall thickness, and provide stopper performance. When the connector arm 29 undergoes excess displacement in the lateral direction as seen in FIG. 1, the sidewall portions 70, 70 are brought into elastic contact against the mounting bracket 13 so as to limit an amount of lateral displacement of the connector arm 29. When the connector arm 29 undergoes excess displacement in the upward direction as seen in FIG. 1, i.e., a rebound direction, the top wall portion 72 is brought into elastic contact against the mounting bracket 13 so as to limit an amount of upward displacement of the connector arm 29. Likewise, the bottom wall portion 74 provides a stopper performance, when coming into elastic contact against the abutting portion 47 as a result of an excess displacement of the connector arm 29 in the downward direction as seen in FIG. 1, i.e., in a bound direction.

However, the bottom wall portion 74, i.e., the first abutting plane, has a unique configuration. Namely, the bottom wall portion 74 includes a central projection in the form of an elastic base 74A having a substantially uniform or constant wall thickness in the lateral direction, and a pair of peripheral projections 82, 82 as well as a plurality of central projections 84 projecting outward or downward from the elastic base 74A. The pair of peripheral projections 82, 82 of bar-like shape are situated at laterally opposite sides, i.e., the opposite sides in the widthwise direction of the elastic base 74A, and continuously straightly extending in a longitudinal direction of the connector arm 29, along with laterally opposite rims of the elastic base 74, respectively. The plurality of central projections 84 have a part-spherical shape.

The plurality of central projections 84 are formed independently from one another, and are situated spaced away from one another. More specifically, each central projection 84 has a cone-like shape, and is spaced apart from another central projections 84 at least at its apex portion. Each of the plurality of central projections 84 has a height dimension substantially identical with that of the pair of peripheral projections 82, and all of the plurality of central projections 84 have the same dimension in their projection height as measured from the elastic base 74A.

As mentioned above, each of the central projections 84, has a part-spherical configuration, and a cone shape in cross section. On the other hand, the peripheral projections 82, as shown in FIG. 8B, provide a substantially flat abutting surfaces 82A, 82A.

As shown in FIGS. 1 and 8, each of the surfaces 82A has a width dimension, i.e., a dimension measured in the lateral direction in FIG. 1, slightly larger than does the corresponding sidewall portion 70 of the rubber stopper 41. The inside edge of each abutting surface 82A is situated inward of the corresponding one of laterally opposite edges of a first abutting plane of the connector arm 29. The central projections 84 are all situated within inward of the abutting surfaces 82A of the peripheral projections 82 so that the all central projections 84 are situated inward of the laterally opposite edges of the first abutting plane of the connector arm 29.

In the present embodiment, eight central projections 84 are formed on an intermediate area interposed between the pair of peripheral projections 82, 82 on the bottom wall portion 74. Four of the eight central projections 84 are arranged on the left-hand side of the bottom wall portion 74 in an alignment on a straight line extending parallel to the inside edge of the left side abutting surface 82A, while the other four central projections 84 are similarly arranged on the right-hand side of the bottom wall portion 74 in an alignment on a straight line extending parallel to the inside edge of the right side abutting surface 82A. A variety of pattern of arrangement of the abutting surfaces 82A may be desirably employed, and the present invention is not particularly limited to the pattern illustrated in this embodiment. For instance, the abutting surfaces 82A may be formed more dispersedly than does the present embodiment.

According to the present embodiment, the peripheral projections 82 and the central portions 84 effectively share functions required for rubber stoppers, whereby the rubber stopper 41 can exhibit a required durability and soft stopper performance as well.

In the case where a rubber stopper has an abutting portion constituted by the peripheral projection 82 entirely, for example, it is difficult for the rubber stopper to absorb a shock upon abutting contact of the rubber stopper against the sub frame 49. In the case where a rubber stopper has an abutting portion constituted by the central projection 84 entirely, the central projection 84 may undergo excess elastic deformation upon abutting contact of the rubber stopper against the mounting bracket 13, resulting in an insufficient durability of the rubber stopper. In the latter case, additionally, the central projection 84 can exhibit soft stopper performance at an initial stage of an abutting action of the rubber stopper against the sub frame 49, but may suffer from an abrupt increase in resistance to deformation thereof, once an amount of elastic deformation of the central projections 84 reaches a predetermined threshold level.

With this respect, the rubber stopper 41 of the present embodiment employs a plurality of mutually independent central projections 84, and the continuously extending peripheral projections as well. Therefore, the rubber stopper 41 is capable of effectively absorbing a shock upon abutting contact of the rubber stopper against the sub frame 49, in comparison with the rubber stopper whose abutting portion is entirely constituted by the peripheral projection 82. Further, the rubber stopper 41 of the present invention is free from the problems of damages of central projections 84 due to excess deformation thereof, and a resultant lower durability thereof. Accordingly, the present rubber stopper 41 can exhibit both of excellent stopper characteristics and sufficient durability, concurrently.

It should be appreciated that since the peripheral projections 82 is superimposed with a sufficient width and thickness dimensions on the laterally opposite edges of the first abutting plane of the connector arm 29, which extend parallel to each other in the longitudinal direction of the connector arm 29. Namely, the peripheral projections 82 extend in the longitudinal direction of the connector arm 29 while spreading laterally inside and outside the laterally opposite edges of the first abutting plane of the connector arm 29. This arrangement is effective to prevent a conventionally experienced excess outward displacement or elastic deformation of the peripheral portion of the bottom wall portion 74 of the rubber stopper 41 along an superficial profile of the rigid abutting member, when the bottom wall portion 74 comes into abutting contact with the sub frame 49. Accordingly, the rubber stopper 41 is less likely to suffer from or free from a stress-concentration at a local area pressed onto the laterally opposite edges of the first abutting plane of the connector arm 29, and a resultant cracking or other defects due to the stress concentration. Therefore, the rubber stopper having the pair of peripheral projections of aforesaid unique structure can enhance durability thereof, and resultant durability of the stopper structure.

Figure 11A:
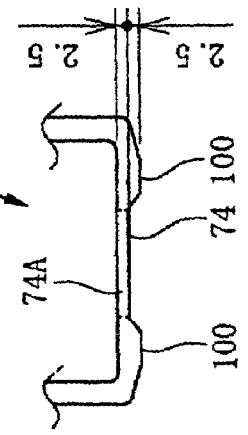
FIGS. 11A-11D are schematic illustrations of principle parts of comparative examples exhibiting spring characteristics shown in FIGS. 9A-9C, respectively.
Figure 11B:
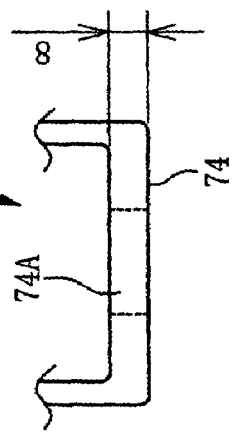
Figure 11C:
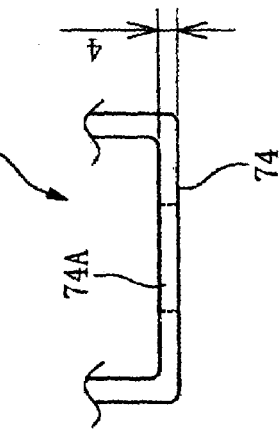

The rubber stopper 41 constructed according to the present embodiment was actually measured in terms of its stopper characteristics, i,e., load-deformation characteristics. The obtained measurement is demonstrated in a graph of FIG. 9D. Likewise, comparative examples 1-3 of rubber stoppers as shown in FIGS. 11A-11C, were measured in terms their stopper characteristics, and the obtained measurements are demonstrated in graphs of FIGS. 9A-9C, respectively. In the comparative example 1 as shown in FIG. 11A, an abutting portion functions as a bound stopper, is constituted by only the elastic base portion 74A of flat-plate shape with a 4 mm wall-thickness dimension. In the comparative example 2 as shown in FIG. 11B, the abutting portion functioning as the bound stopper measures more values, i.e., 8 mm in thickness.

Figure 12A:
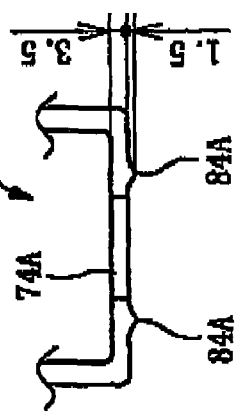
FIG. 12A is a fragmental schematic cross sectional view of the rubber stopper of the present invention.
Figure 12C:
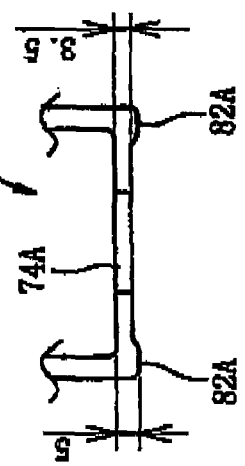
FIGS. 12C is a fragmental schematic cross sectional view of the rubber stopper having spring characteristics shown in graph of FIG. 10A.
Figure 12E:
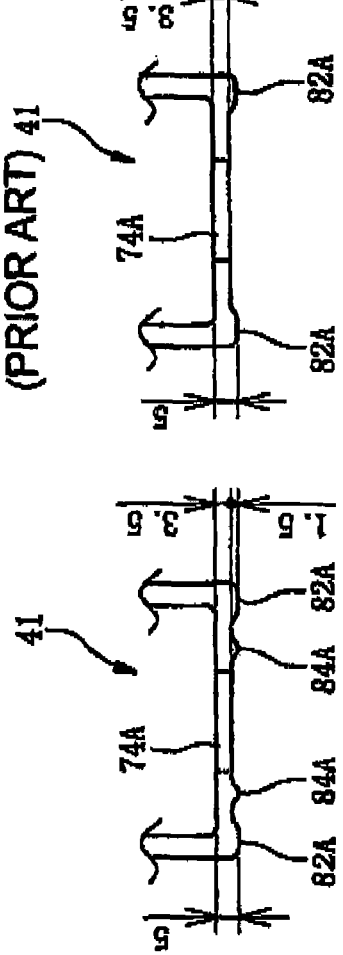
FIG. 12E is a fragmental schematic cross sectional view of the rubber stopper having spring characteristics shown in graph of FIG. 10B.
Figure 12B:
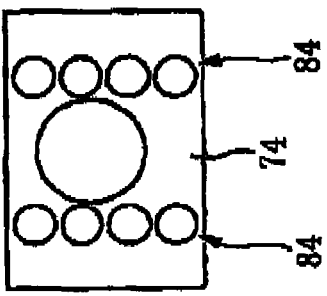
FIG. 12B is a schematic bottom plane view of the rubber stopper of the present invention.
Figure 12D:
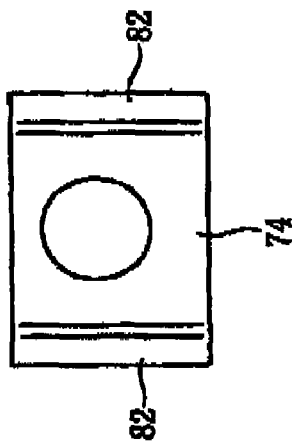
FIG. 12D is a schematic bottom plane view of this rubber stopper.
Figure 12F:
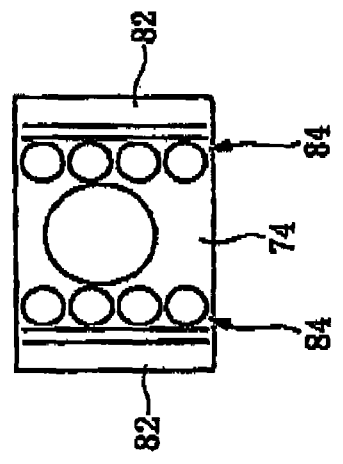
FIG. 12F is a schematic bottom plane view of this rubber stopper.
Figure 13:
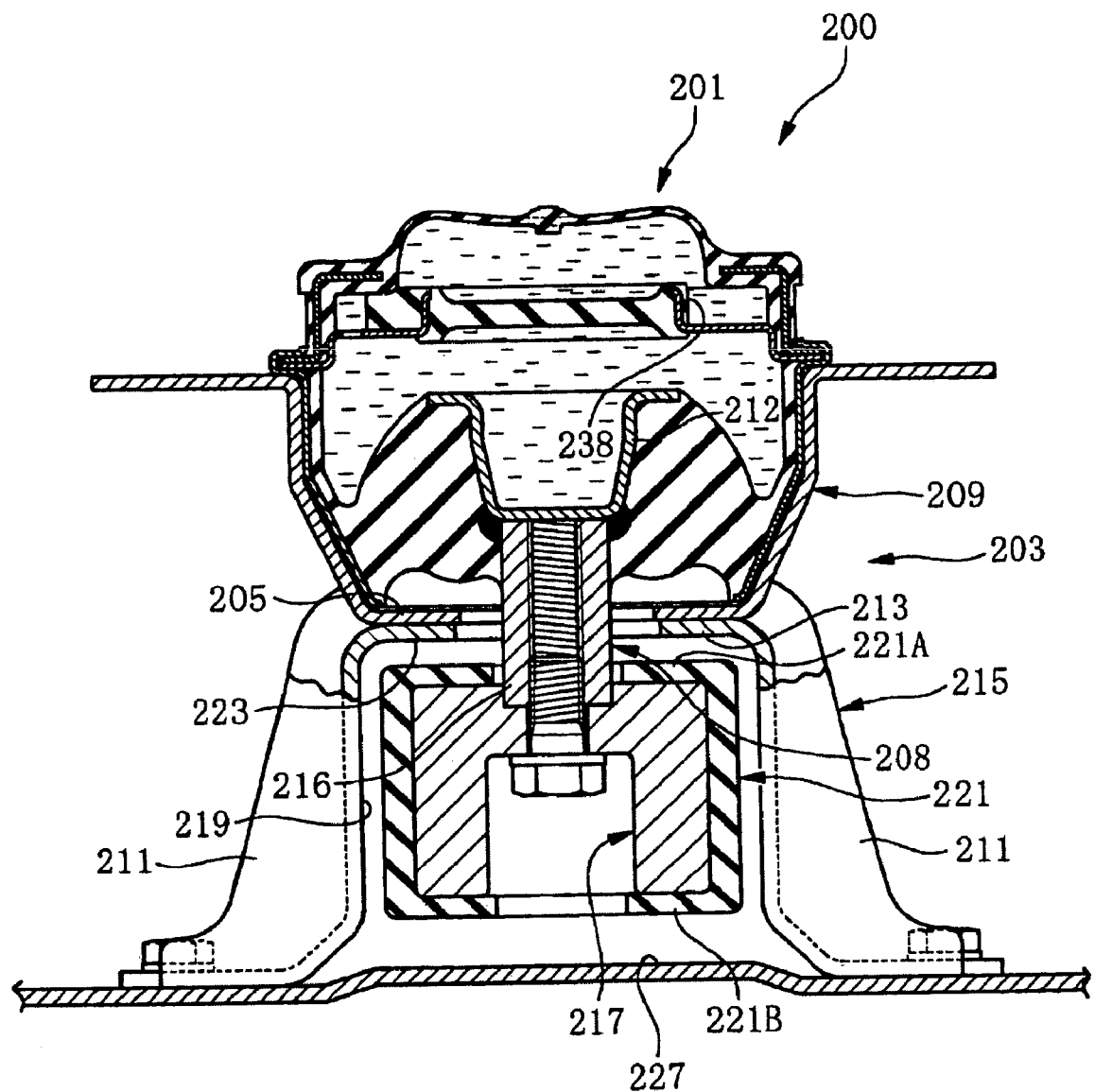
FIG. 13 is a vertical cross sectional view of an example of a conventional fluid-filled engine mount having a stopper structure using a conventional rubber stopper.

The comparative example 3 as shown in FIG. 11C, has a plurality of projecting portions 100 formed on and projecting from the elastic base portion 74A, and extending in the lateral direction with a relatively small width dimension. FIGS. 12A and 12B show schematic illustrations of the rubber stopper 41 of the present invention. FIGS. 12C and 12D show a comparative example 4 that is different from the present rubber stopper 41 in that no central projection is formed. FIGS. 12E and 12F show a comparative example 5 that is different from the present rubber stopper 41 in that no peripheral projection is formed.

Stopper characteristics of the comparative examples 4 and 5 were similarly measured, and is demonstrated on graphs of FIGS. 10A and 10B. As is understood from a load-deformation line illustrated on the graph of FIG. 9D, the rubber stopper 41 exhibits soft spring characteristics as a low deformation region, and experiences smooth and abrupt raise of the line, once the rubber stopper 41 undergoes somewhat deformation thereof. This shows that the rubber stopper 41 can exhibit both of soft-touch stopper characteristics and an excellent displacement limiting performance. On the other hand, the graphs of FIGS. 10A and 10B show that the comparative examples as shown in FIGS. 12C-12F are insufficient one of these characteristics.

The rubber stopper 41 constructed according to the present embodiment, as well as a comparative examples 1-5 as discussed above were actually installed on an automotive vehicle, and their durability were actually judged by visual inspection after a driving test, while stopper performance during driving were actually evaluated by a feeling test for a shock. Obtained measurements and results of the feeling tests are shown in Table 1. As is understood from Table 1, the present invention is superior than any other comparative examples in terms of stopper characteristics and durability thereof.

Figure 11D:
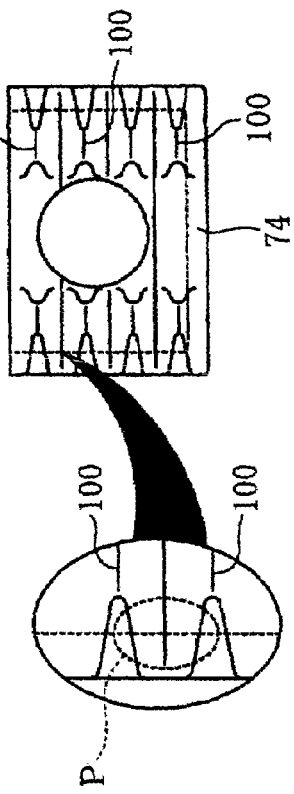

Table 1 indicates an insufficient durability of the comparative example 3 as shown in FIG. 11C. This insufficiency is derived from the fact that a portion P indicated in FIG. 11D is situated on the laterally opposite edges of the connector arm 27 may be locally and excessively deformed due to the presence of this corner, and subjected to a relatively large stress, leading to earlier cracks and deterioration of the rubber stoppers.

While the presently preferred embodiment of this invention has been described above in detail by illustrative purpose only, it is to be understood that the invention is not limited to the details of the illustrated embodiment, but may be otherwise embodied.

The stopper structure of the present invention may be similarly applicable to a various types of engine mounts, other than a fluid-filled hanging engine mount in the illustrated embodiment.

It is also to be understood that the present invention may be embodied with various other changes, modifications and improvements, which may occur to those skilled in the art, without departing from the spirit and scope of the invention defined in the following claims.

What is claimed is:

1. A stopper structure for an engine mount including an elastic body elastically connecting two mounting members, the stopper structure comprising:

a rigid abutting member connected to one of the two mounting members, and extending in a longitudinal direction with a substantially rectangular shape in cross section; and a rubber stopper including: a base portion of tubular shape in cross section, and being secured press-fit onto the rigid abutting member without being adhesive to a superficial surface of the rigid abutting member; a pair of peripheral projections formed on laterally opposite sides of a first abutting plane of the base portion and extending in the longitudinal direction of the rigid abutting member; and at least one central projection formed on an intermediate area interposed between the pair of peripheral projections of the first abutting plane surface of the base portion, wherein the pair of peripheral projections are situated on laterally opposite edges of a corresponding first abutting plane of the rigid abutting member, respectively, and have a width dimension extending inside and outside the edges of the rigid abutting member, wherein the at least one central projection projects outward from the first abutting plane of the base portion with a height dimension the same as that of the pair of peripheral projections,

TABLE 1

|  | COMP. EXAMPLE 1 | COMP. EXAMPLE 2 | COMP. EXAMPLE 3 | PRESENT INVENTION | COMP. EXAMPLE 4 | COMP. EXAMPLE 5 |
|---|---|---|---|---|---|---|
| Thickness [Base] | 4.0 mm | 8.0 mm | 2.5 mm | 3.5 mm | 3.5 mm | 3.5 mm |
| [Projection] |  |  | 2.5 mm |  |  |  |
| [Peripheral Projection] |  |  |  | 1.5 mm | 1.5 mm | None |
| [Central Projection] |  |  |  | 1.5 mm | None | 3.5 mm |
| Durability | Sufficient Durability | Sufficient Durability | Insufficient Durability | Sufficient Durability | Sufficient Durability | Insufficient Durability |
| Graph No. | FIG. 9A | FIG. 9B | FIG. 9C | FIG. 9D | FIG. 10A | FIG. 10B |
| Feeling Test | Poor Feeling | Poor Feeling | Good Feeling | Good Feeling | Insufficient Feeling | Poor Feeling | wherein the first abutting plane of the base portion is brought into abutting contact with an abutting portion provided by a member connected to an other one of the two mounting member, upon application of a vibrational load to the engine mount in a bound direction, and wherein each of the pair of peripheral projections provides a substantially flat abutting surface on a projecting portion thereof, and the at least one central projection has a cone-like shape.

2. A stopper structure according to claim 1, wherein the base portion has a wall thickness dimension larger than the height dimension of the pair of peripheral projections.

3. A stopper structure according to claim 1, wherein a direction in which the rubber stopper is inserted onto the rigid abutting member to be secured press fit thereon is conform to the longitudinal direction in which the pair of peripheral projections extend.

4. A stopper structure according to claim 1, wherein the at least one central projections comprises a plurality of central projections, and the plurality of central projections arranged in at least one straight line extending parallel to the pair of peripheral projections.

5. A stopper structure according to claim 1, wherein the at least one of the central projection is situated inside the laterally opposite edges of the first abutting plane of the rigid abutting member in the lateral direction.

6. A stopper structure according to claim 1, wherein the stopper structure is arranged for a hanging type engine mount for automotive vehicles, the other one of the mounting members is connected to a body of the vehicle, and the rigid abutting member comprises a connector arm disposed below the engine mount and connected to the one of the two mounting members in order to hang a power unit from the one of the two mounting members, and wherein the first abutting plane of the base portion of the rubber stopper is brought into abutting contact with an abutting portion provided on the body of the vehicle upon application of a vibrational load to the engine mount in a bound direction.

* * * * *